3,187,769
MIXING APPARATUS
James McDowell and Frank C. Schrack, Chicago, Ill., assignors to The Diversey Corporation, Chicago, Ill., a corporation of Illinois
Filed May 19, 1961, Ser. No. 111,347
5 Claims. (Cl. 137—564.5)

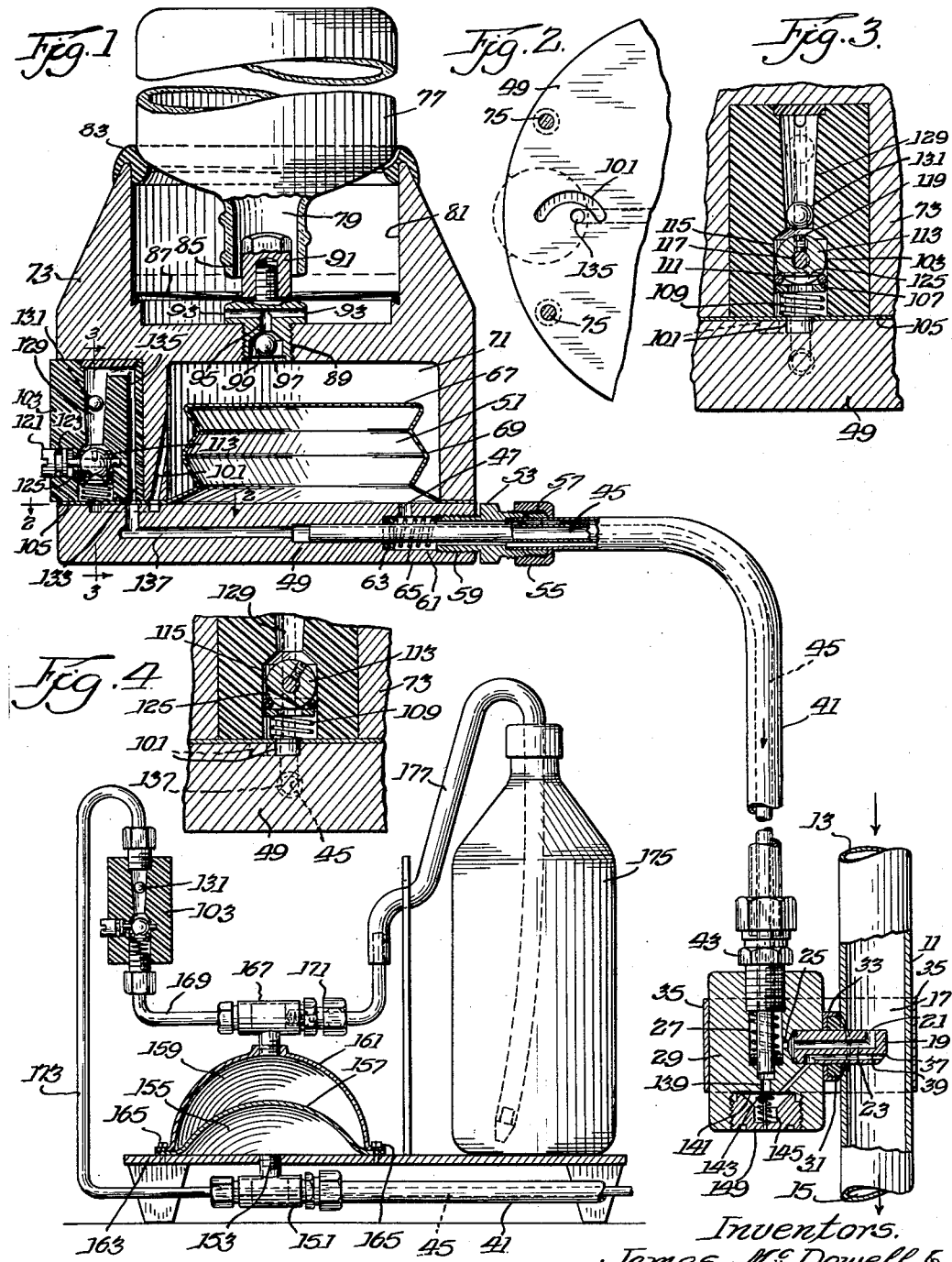

This invention is directed to mixing or combining apparatus for controlling the flow of and subsequent ejection of pre-established amounts of fluid or gas into another fluid stream, the flow of which controls the mixture resulting.

In one of its particularly useful applications, the invention as it is organized provides for ejecting small amounts of chemicals into the circulating final rinse water in dishwashing apparatus. This mixture is achieved in general by mechanism for automatically controlling the flow of a liquid from any appropriate form of container or supply to a feed reservoir from which, through a suitable metering device and in accordance with the active pressure in one supply, the chemical to be added is caused to mix into the final solution in a pre-established concentration. The invention provides a supply source of liquid into which an energy pick-up component is placed and through the aid of which a control effect is established through a pressure differential mechanism to determine the infeeding of a chemical to mix with the supply in a chemical concentration determined by the supply pressure and flow.

The chemical to be mixed may either be supplied gravitationally or, by appropriate siphoning mechanism, drawn into a chamber or reservoir from which it is forced outwardly by the effective pressure of the liquid from the supply at the time of liquid flow. The chemical as it is forced outwardly is directed through an appropriate metering valve, which may be graduated, if desired, set to control the maximum chemical passing therethrough at some pre-selected volume per established unit time period as a maximum. The maximum flow is permitted at time periods when the supply liquid is maintained under greatest velocity and pressure and it is reduced to a minimum or even cut off completely when the velocity and pressure of the supply drops to a minimum. Suitable check-valves preclude contamination of the chemical supply by either the supply fluid or the drawn-off chemicals and also function to preclude siphoning action from the main supply which, if permitted, could serve to reduce the chemical supply.

The invention may assume various forms but in connection with each form it possesses structure which requires a minimum amount of attention from any controlling operator. This is possible because the chemical to be mixed is withdrawn from its supply source completely automatically and emptied at a maximum predetermined rate. The actual reduction is determined by the velocity and pressure-head differential created by intermittent operation and flow of liquid or fluid from the main supply and through the provision of suitable time-delay operation.

Within the objects of the invention are those of improving over heretofore used methods for injecting pre-established amounts of one type of fluid into a flow path of fluid or liquid of dissimilar character. Also, it is an object of this invention to provide mechanism for permitting a supply of feed fluid for a substantial time period following that at which the supply of chemical to be mixed appears to be exhausted. A further object of the invention is that of insuring direct and continuous automatic feed of a mixture fluid at a highly accurate flow rate. Other objects of the invention are those of providing greater economy, higher efficiency and improved reliability over other heretofore practiced methods of mixing chemicals into liquid supply flows to utilization apparatus.

The invention has been illustrated in certain of its preferred forms and as to certain of its components by the accompanying drawings wherein:

FIGURE 1 is an elevational view, partly in section, of a feed and control system formed in accordance with the aforesaid invention;

FIGURE 2 is a view, prior to assembly, of the upper and lower portions of the device taken along the line 2—2 of FIGURE 1 to show the chemical entry and exit passages to the metering valve mechanism;

FIGURE 3 is a view in section taken along the line 3—3 of FIGURE 1 to show the metering valve in a closed position;

FIGURE 4 is a view of a portion of the metering valve of FIGURE 3 looking in the same direction as the section of FIGURE 3 and showing the valve in a partially open position; and FIGURE 5 is a modified control system wherein the chemical to be mixed with the main liquid flow is withdrawn by a siphoning mechanism.

Making reference to the drawings for a further understanding of this invention, it will be apparent that one liquid to be mixed is fed into a conduit with the liquid or fluid flow injected being in proportion to the liquid flow within a conduit constituting a main liquid supply passageway. In accordance with a preferred form of the invention liquid flow from a suitable supply source (not shown) is passed through a tubular conduit 11 and flows, illustratively, from an inlet end 13 through to an outlet end 15 under the pressure and head of the source. At a selected region, such as 17, between the fluid entrance 13 and the fluid outlet 15, a suitable energy pick-up device or probe 19 is positioned with its inlet port 21 faced in the direction from which the inlet fluid is flowing.

The energy pick-up device or probe 19, as can be clearly seen in FIGURE 1, comprises a plug-like element with an internal bore 23 extending from the inlet port 21 to an outlet tapping point 25 which connects into an inner tubular region 27 of a pressure differential device 29. The energy pick-up section of the probe 19 of the pressure differential device 29 extends through the wall of the tubular member 11 and is held tightly thereagainst by a packing 31 held within a cup-shaped member 33 and pressed tightly against the tubular conduit by a clamping ring 35 extended about each of the pressure differential component and its energy pick-up and the tubular member, as can be seen in section by FIGURE 1. This clamping ring may be suitably tightened in any desired manner (not shown).

The energy pick-up, as will be later pointed out, has on the downstream side an angular slope or taper represented at 37 into which a tubular bore 39 is extended, as will later be apparent. At this time may it suffice to state that by reason of the slope on the downstream side and the resultant path change of the flowing fluid stream resulting in the formation of more or less of an eddy, the effective pressure of the fluid within the tubular member 11 is reduced at the region where the tubular bore 39 enters into the tubular member 11 as compared to the pressure effective at the inlet port 21 leading into the tubular bore 23.

Fluid flowing through the bore 23 and its outlet 25, so as to pass interiorly of the inner tubular region 27, is caused to flow into the tube 41 held to the pressure differential component 29 by the indicated threaded fitting 43 and the tapping nut fastened about the tube.

The tubular member 41, as can be seen, has a second tubular member 45 positioned interiorly thereof with the fluid flow in the tubular member 45 being kept completely clear from the fluid flow in the main tube 41. Such fluid as flows through the main tube 41 and is due to the entering fluid reaching the tube 11 at the inlet 13 passes through the tube to an inlet port 47 in the base member 49. This port leads into the interior of a high pressure chamber 51, later to be described.

The tube 41, on entering into the base member, terminates in a plug fitting 53 surrounded by the same tightly and held thereto by the tightening nut 55 and packing 57, the plug fitting 53 being tapped at 59 into the base member 49 at an enlarged region 61. The fluid passing in the tube 41 is precluded from mixing with any fluid flow in the interior tube 45 by an O-ring 63 which is spring-pressed toward the bottom of the enlarged bore 61 in the base with pressure being applied by a spring 65 and the threaded tapping member 53 to force the O-ring tightly against the shoulder of the fitting, as a seal. With this condition obtaining, liquid within the tube 41 may flow into the high pressure chamber 51 which has both a fluid-tight resilient upper surface 67 and a resilient and collapsible side member 69 which is also fluid-tight. As can be appreciated from the showing of FIGURE 1, the high pressure chamber 51 with its resilient upper and lateral surfaces is generally circular in cross-section. It fits internally of the low pressure chamber region 71 formed in the upper portion of a body member 73 which is held to the base member 49 by suitable bolts 75 or the equivalent.

The pressure and velocity of the fluid entering the tube 11 at the inlet 13 will determine (neglecting pipe losses and the like) the amount of expansion of the resilient side walls 69 of the high pressure reservoir or chamber 51. The volume of reservoir or chamber 71 will consequently be reduced with volume increase of chamber 51 and increased with volume reduction of chamber 51. The result is that the chamber or reservoir 71 holding the fluid to be mixed withdraws fluid from its supply with its volume increase and with its volume decrease the fluid is forced out. When the volume of the reservoir 51 decreases as the flow in tube 11 is reduced and stopped the liquid from the reservoir 51 is forced back through the tube 41 and back through the tapping 23 and port 21 into the tube 11.

To achieve a mixing of one fluid, such as a chemical, for instance, with the fluid flowing within the tubular member 11, the content of the schematically indicated supply reservoir 77 is permitted to flow from the outlet neck 79 thereof into a trough 81 within the upper body member 73 when the supply chamber 77 is positioned to fit tightly upon the packing ring member 83 forming the upper wall or extremity of the chamber 81 in the upper body member 83.

Under such circumstances, with the neck 79 of the supply reservoir 77 (usually in the form of a bottle or the like) turned downwardly, any liquid, such as a chemical contained within the supply reservoir 77, is permitted to flow outwardly through the region 85 to pass through an appropriate filter 87 to collect in the bottom of the recess 81. A threaded bore 89 passes through the upper body member to connect the chamber 71 to the chamber 81. There is a suitable check-valve, as conventionally represented, fitted into this passage with the filter being held tightly to the check-valve by the fitting 91 threaded thereto. It will be evident from the drawings that the check-valve mechanism is provided with an opening 93 extending thereacross and leading into the lower portion of the reservoir or chamber 81 so that liquid passing through the filter 87 and into the lower region of the reservoir 81 finds an outlet through the tapping passage 95 into the chamber 71. The outlet from the passage 95 is enlarged and there is fitted therein a suitable closure ball 97 held in the enlarged passage by a front filter screen 99.

With increases in pressure in the high pressure reservoir of chamber 51 serving to expand the collapsible side walls 69 thereof and thereby decrease the volume within the chamber or reservoir 71, greater pressure is exerted upon any liquid in the chamber or reservoir 71 and consequently the ball 97 is pressed inwardly toward the passage 95 to reduce the outlet flow. Simultaneously, fluid contained in the chamber or reservoir 71, since it cannot flow back into the chamber or reservoir 81 with increases in pressure in the chamber or reservoir 51, is forced outwardly from the chamber 71 through a tubular connection 101 to enter into a metering valve mechanism 103.

Details of the metering valve mechanism are shown mainly by FIGURES 3 and 4 from which it will be apparent that there is fastened between the base member 49 and the upper body member 73 a suitable gasket 105 to prevent leakage of fluid when the upper and lower members are held together by the fastening bolts 75. Liquid flowing in the tubular section 101 flows into the lower port of the metering valve 103 and upwardly through the washer 107 which is spring-pressed upwardly by the spring 109. The washer 107 on its upper side presses against an O-ring 111 which, in turn, fits against a ball 113 and, depending upon the pressure of the spring, provides a liquid-tight seal between the ball 113 and the inner wall tubular recess 115 of the metering valve so that the ball of the metering valve is held securely within the inner wall tubular recess by a pin 117 passing therethrough and to which it is held by any appropriate means such as the set-screw 119. One end of the pin (see FIGURE 1) extends into the body of the metering valve. The other end terminates in a notched fitting 121 provided for permitting the ball to be turned. A fluid-tight connection is provided by the indicated O-ring 123.

The ball 113 has a slot 125 cut therein. This slot extends completely across the ball in one direction and penetrates to a depth sufficient to permit fluid to flow therethrough with the valve turned but only to such depth that the valve can be completely shut off for other conditions, as for a situation of the character depicted by FIGURE 3. With the valve turned, as shown in FIGURE 4, it will be appreciated that liquid flowing into the inlet 101 must flow through the notched portion of the ball 113 and around the O-ring seal to enter into the upper passage 129 in metered quantities dependent upon the pressure and velocity of the inlet fluid and the permissible opening into the passage 129.

In the passage 129 there is a ball 131 which is of a size substantially corresponding to the bottom of the cross-section of the passage 129 so that with no fluid flow in the outlet passage 129 the ball seats in substantially the position shown in FIGURE 3, whereas for fluid flow conditions the ball rises under the support of the flowing fluid. Then, dependent upon the flow the height of the ball 131 with respect to the top of the ball 113 of the metering valve, provides an indication of the liquid flowing. The metering valve may, in part, be formed with a translucent or plastic covering, as indicated schematically at 133, and fluid flow through the passage 129 then passes out through the outlet passage 135 and through the tapped opening 137 in the base member 49 to flow into the interior tube 45.

The liquid flowing in the interior tube 45 then passes into the pressure differential element 29 and then through the tube outlet 139 and past the diaphragm 141 and the anti-siphon tappet 143 which is spring-pressed upwardly by a spring 145 held in the closure member 149. Fluid can pass about the diaphragm 141 at times when the tappet 143 is depressed. This condition can occur when the pressure effective at the outlet 139 of the tube 45 exceeds that effective from the effect of the spring 145. Where the pressure in the bore 39 which connects into the chamber surrounding the tappet 143 in the closure plug 149 is overcome, disregarding the force required to overcome the normal rigidity of the flexible diaphragm, that fluid which passes the metering valve then flows out through the bore 39 to mix beyond the energy pick-up 19 with the fluid entering at the region 13 so that in the tubular member 11 at the outlet 15 there is a mixture of both the original fluid and the added fluid.

The operation of the described device is such that a small portion of the fluid flowing in tube 11 from the entering region 13 is passed through the inlet 21 and into the tube 41. The flexible bellows 69 which form the side wall of the chamber or reservoir 51 are expanded with an increase in the entering velocity of the fluid at the port 21 and the resultant buildup of pressure which is provided in the reservoir 51 due to fluid flow through the described paths and the tube 41. Fluid flow in the tube 11 thus serves to increase the volume of the chamber or reservoir 51.

However, with fluid flow cut off into the tube 11 and thus also cut off into tube 41, as above explained, the volume of the reservoir 51 is decreased and the contents thereof flow back into the tube 11. Expansion or increase in volume of the chamber or reservoir 51, which is supported within the reservoir 71, decreases the volume of the reservoir 71 and forces liquid therein outwardly through the metering valve 103, the passages 135 and 137, and the tube 45 to flow into the supply tube through the bore 39, as above explained. Reduced pressure, and thus the creation of a partial vacuum, permits the reservoir 71 to fill from the reservoir 77 for egress, as above explained. Pressure within the bore 39 cannot force liquid from the supply backwardly through the tube 45 because of valve 143 assembly and spring 145.

If reference is now made to the form of the invention disclosed by FIGURE 5, it will be seen that tube 41 is broken away to the right and it can be assumed that the connection of this portion of the tube is the same as that shown in FIGURE 1 to the right of the fitting or tightening nut 55. So considered with fluid flow in the tube 11 and from the entrance 13, fluid is forced through the outer portion of the tube 41 and through the fitting 151 and the inlet port 153 into the chamber 155 having the flexible and expandable separating member 157 to isolate the chamber 155 from the chamber 159 whose outer wall is formed by the generally bell-shaped member 161. Each of the bell-shaped members 161 and the flexible members 157 is secured to the base member 163 in many appropriate fashion as by the bolts 165, with appropriate packing rings included to maintain a fluid-tight fit.

Accordingly, with fluid flowing in the tube 11, pressure is built up within the high pressure chamber 155 and forces the flexible separating wall 157 to expand or stretch and reduce the volume of the reservoir 159 and, at that time, force outwardly any fluid therein contained through the fitting 167 and the outlet tube 169 through the metering valve 103. When this occurs, the check-valve 171 (illustratively of the general type shown as the valve 89 in FIGURE 1) closes. Consequently, any fluid in the reservoir 159 must be forced out through the tube 169 and the metering valve 103 into the tube 173 which connects tightly with the interior tube 45 and under these conditions, which are repeated by the fluid flow in tube 11, fluid which is present in the reservoir 159 is mixed in the fashion already described. When fluid flow is cut off in the tube 11, the pressure acting against the lower surface of the reservoir separating wall 157 is reduced and at least a partial vacuum is formed within the reservoir 159.

At this time, the check-valve 171 can open and fluid which is contained within the schematically indicated reservoir 175 supported on the base 163 adjacent to the apparatus is withdrawn through the tube 177 and into the reservoir 159 to replace and replenish that fluid which has been forced out by the expansion of the flexible receptacle wall 159, after which the operational cycle is again repeated as necessary.

In the assumed form of illustration where the components are used as a part of an automatic control for establishing the amount of chemical injected into rinse water of a dish-washing mechanism, it is, of course, apparent that the flow of water which may be assumed as the first fluid in the tube 11 is intermittent as a result of the normal operation of the dish-washing machine (not shown). At all times when water is flowing through the tube 11, chemical will be injected and mixed with it in the energy pick-up mechanism by reason of the fact that the pressure buildup in the reservoir 51 or the reservoir 155, as the case may be, is sufficient to decrease the volume of the reservoir 71 or the reservoir 159 and force the chemical therein contained outwardly to be mixed when it flows outwardly through the bore 39 after having passed through the tubular member 45. Cut off of the rinse water, as above explained, serves to permit the chemical from the reservoir 77 or 175, as the case may be, to replenish that amount forced outwardly of reservoir 71 or 159. The replacement of chemical is an amount governed by the time delay system or the maximum quantity possible, as the case may be. Whenever the time delay system such as is built into the normal operation of the dish-washing machine expires and the rinse valve again opens, in well-known fashion, fluid flow is created in the tube 11 and the feed cycle repeats.

Various modifications of the invention may be made within the concept of this disclosure.

Having now described the invention, what is claimed is:

1. Mechanism for automatically mixing controlled amounts of a first fluid with a second fluid comprising supply means through which the second fluid is adapted to flow toward a utilization region, a reservoir, means to feed the first fluid into the reservoir and to preclude any reverse flow thereof, means to control and modify the reservoir volume instantaneously available to the first fluid, a probe means included in the flow path of the second fluid for diverting minute portions of the said second fluid, said probe means having a pair of tubular fluid passages therein with an opening to one passage being faced toward the direction of flow of the second fluid and with an opening into the other passage faced from the direction of flow of the said second fluid and shielded from the flow path by the probe, tubular means having two independent fluid-directing passages therethrough, means to establish a communicating relationship between the tubular passage of the probe means facing the flow path of the second fluid and a first end of one of the fluid-directing passages, means to establish a communicating realtionship between the second end of the said one of the fluid-directing passages and the reservoir volume control means to supply the diverted second fluid into the said reservoir volume control means, thereby to reduce the volume of the first fluid within the reservoir at a rate substantially proportional to the instantaneous velocity and pressure condition of the second fluid, means to establish a connection between one end of the other one of the independent fluid-directing passages and the reservoir for supplying thereto from the reservoir a volume of the first fluid which is proportional to the reservoir volume change, means to establish a communicating relationship between the second end of the second fluid-directing passage within the tubular means and the tubular passage within the probe facing away from the direction of flow of the second fluid for feeding the controlled volume of the first fluid outwardly from the said tubular means for mixing with the second fluid in a region of reduced pressure relative to the pressure developed in the first passage within the probe, and means to preclude flow of the second fluid through the second passage within the tubular member toward the reservoir.

2. The mechanism claimed in claim 1 wherein said volume control means comprises an expansible means within the reservoir receiving the first fluid.

3. The mechanism claimed in claim 2 comprising, in addition, means for indicating the flow quantity of the first fluid passed through the second fluid-directing means of the tubular member for mixing with the second fluid.

4. The mechanism claimed in claim 1 comprising, in addition, a one-way valve for feeding the first fluid from the second fluid-directing means in the tubular member into mixing relationship with the second fluid.

5. The mechanism claimed in claim 1 comprising, in addition, means within the tubular member for isolating the inflowing second fluid in the first fluid-directing means from the outflowing first fluid in the second fluid directing means.

References Cited by the Examiner

UNITED STATES PATENTS

| 1,215,129 | 2/17 | Edlich | 73—209 |
| 2,323,341 | 7/43 | McGill | 137—564.5 XR |
| 2,778,223 | 1/57 | Kimbrell | 73—209 |
| 2,932,317 | 4/60 | Klosse | 137—564.5 |
| 2,984,250 | 5/61 | Foster | 137—101.11 |
| 3,040,774 | 7/62 | Stenberg | 137—564.5 |

M. CARY NELSON, *Primary Examiner.*